(12) United States Patent
Ratner et al.

(10) Patent No.: US 9,712,835 B2
(45) Date of Patent: Jul. 18, 2017

(54) VIDEO ENCODING SYSTEM AND METHOD

(75) Inventors: Edward Ratner, Iowa City, IA (US); Jeffrey Alan Keswin, New York, NY (US); Austin Thomas Griffith, Iowa City, IA (US)

(73) Assignee: Lyrical Labs LLC, New York, NY (US)

( * ) Notice: Subject to any disclaimer, the term of this patent is extended or adjusted under 35 U.S.C. 154(b) by 353 days.

(21) Appl. No.: 13/428,707

(22) Filed: Mar. 23, 2012

(65) Prior Publication Data
US 2012/0250755 A1 Oct. 4, 2012

Related U.S. Application Data

(60) Provisional application No. 61/468,872, filed on Mar. 29, 2011.

(51) Int. Cl.
*H04N 7/12* (2006.01)
*H04N 19/436* (2014.01)
*H04N 19/156* (2014.01)

(52) U.S. Cl.
CPC ......... *H04N 19/436* (2014.11); *H04N 19/156* (2014.11)

(58) Field of Classification Search
None
See application file for complete search history.

(56) References Cited

U.S. PATENT DOCUMENTS

| | | | | |
|---|---|---|---|---|
| 6,407,680 B1* | 6/2002 | Lai | ..................... | H04N 7/17318 341/50 |
| 6,675,189 B2* | 1/2004 | Rehg | ..................... | G06N 99/005 709/231 |
| 6,870,883 B2 | 3/2005 | Iwata | | |
| 8,350,886 B2* | 1/2013 | Horihata | .................. | B60R 1/00 348/14.01 |
| 8,499,088 B1* | 7/2013 | Breau | .................. | H04L 67/303 709/217 |
| 2005/0036543 A1* | 2/2005 | Vetro | ............... | H04N 21/21805 375/240.01 |
| 2006/0188014 A1* | 8/2006 | Civanlar | ........ | H04N 21/234327 375/240.03 |
| 2007/0067485 A1* | 3/2007 | Stotland | ............. | H04L 12/5695 709/232 |
| 2008/0084926 A1* | 4/2008 | Valenzuela | ............ | H04N 21/21 375/240.01 |

(Continued)

FOREIGN PATENT DOCUMENTS

JP   2008-165746 A   7/2008

OTHER PUBLICATIONS

International Preliminary Report on Patentability in International Application No. PCT/US2012/30338, Mar. 2014, 7 pages.

(Continued)

*Primary Examiner* — Jorge L Ortiz Criado
*Assistant Examiner* — Samuel D Fereja
(74) *Attorney, Agent, or Firm* — Faegre Baker Daniels LLP

(57) ABSTRACT

A video encoding system is disclosed to process a video file into one or more desired formats. The video file may have portions processed in parallel. The video encoding system may include a scalable computing resource. The scalable computing resource may be provided by a cloud computing platform.

22 Claims, 12 Drawing Sheets

(56) References Cited

U.S. PATENT DOCUMENTS

| | | | |
|---|---|---|---|
| 2008/0086570 A1* | 4/2008 | Dey | H04N 21/2402 709/231 |
| 2008/0195664 A1* | 8/2008 | Maharajh | G06F 17/30035 |
| 2009/0172754 A1* | 7/2009 | Furukawa | H04N 5/765 725/91 |
| 2009/0307464 A1* | 12/2009 | Steinberg et al. | 712/31 |
| 2010/0118114 A1* | 5/2010 | Hosseini | H04N 7/148 348/14.09 |
| 2010/0223649 A1* | 9/2010 | Suitts | H04N 21/23418 725/105 |
| 2010/0272187 A1* | 10/2010 | Civanlar | G11B 27/105 375/240.25 |
| 2011/0051811 A1 | 3/2011 | Wang et al. | |
| 2011/0072440 A1* | 3/2011 | Lee | G06F 9/5083 718/105 |
| 2011/0188577 A1* | 8/2011 | Kishore et al. | 375/240.16 |
| 2011/0296473 A1* | 12/2011 | Babic | H04N 21/21 725/87 |
| 2011/0305273 A1* | 12/2011 | He | H04N 19/436 375/240.02 |
| 2012/0143983 A1* | 6/2012 | Kipnis | G06F 3/14 709/217 |
| 2012/0147958 A1* | 6/2012 | Ronca et al. | 375/240.16 |
| 2012/0246158 A1* | 9/2012 | Ke | G06F 17/30463 707/736 |

OTHER PUBLICATIONS

International Search Report and Written Opinion in International Application No. PCT/US2012/30338, Jun. 2012, 8 pages.
Amazon Simple Storage Service (Amazon SQS), http://aws.amazon.com/$3/, webpage printed Feb. 21, 2011, 5 pages.
Amazon Simple Queue Service (Amazon SQS), http://aws.amazon.com/sqs, webpage printed Mar. 29, 2011, 4 pages.
Amazon Relational Database Service (Amazon RDS), http://aws.amazon.com/rds/, webpage printed Mar. 29, 2011, 8 pages.
Amazon Elastic Compute Cloud (Amazon EC2), http://aws.amazon.com/ec2/, webpage printed Mar. 29, 2011, 10 pages.
Amazon web services, Introducing AWS CloudFormation, http://aws.amazon.com/, webpage printed Mar. 29, 2011, 2 pages.
FLV—flv encoder, flv converter, flv player, flv downloader from Foxreal Studio, http://www.flvsoft.com/, webpage printed Mar. 29, 2011, 2 pages.
FFMPEG, http://www.ffmpeg.org/, webpage printed Mar. 29, 2011, 9 pages.
VideoLAN—VLC: Pffocial site—VLC media player, http://www.videolan.org/, webpage printed Mar. 29, 2011, 3 pages.
VideoLAN—x264, the best H.264/AVC encoder, http://www.videolan.org/developers/x264.html, webpage printed Mar. 29, 2011, 2 pages.
Yasuo Sambe et. al. "A Study on High Speed Distributed Video Transcoding". ITE Technical Report, vol. 26, No. 76, The Institute of Image Information and Television Engineers (ITE), Nov. 21, 2002, pp. 13-18. ISSN: 6839.
Dongmahn Seo, et. al. "Load Distribution Algorithm Based on Transcoding Time Estimation for Distributed Transcoding Services". Proc. of Int. Conf. on Information Science and Applications (ICISA) 2010, Apr. 23, 2010, pp. 1-8, ISBN: 978-1-4244-5941-4.
Yasuhiro Naoi. Report 2 The other side of the Cloud; Cloud Computing World. US Insight, vol. 37 (Fall 2008), NTT Data Co. Ltd., 2008, pp. 16-27.
Zhiqiang Tian, et. al, "High Performance Cluster-based Transcoder". Prof. of Int. Conf. on Computer Application and System Modeling (ICCASM) 2010, vol. 2, Oct. 24, 2010, pages from V2-48 to V2-52, ISBN: 978-1-4244-7235-2.
Genya Okada et. al. "A Multi-Server Video Encoding System Using Divided Video Files at Scene Changes". IEICE Technical Report, vol. 108. No. 392, IEICE, Jan. 15, 2009, pp. 79-82, ISSN: 0913-5685.

\* cited by examiner

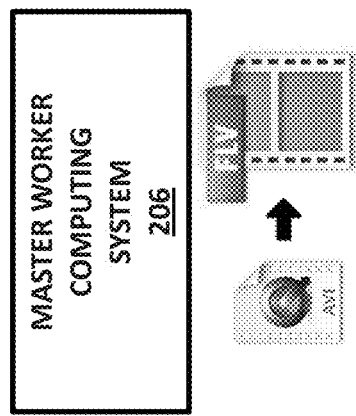
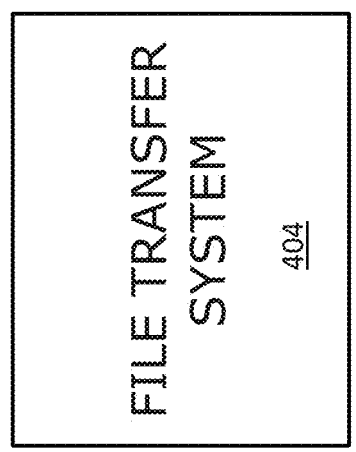
FIG. 9

VIDEO ENCODING SYSTEM AND METHOD

RELATED APPLICATION

This application claims the benefit of U.S. Provisional Application Ser. No. 61/468,872, filed Mar. 29, 2011, titled VIDEO ENCODING SYSTEM AND METHOD, the disclosure of which is expressly incorporated by reference herein.

BACKGROUND

As video viewing has proliferated on the World Wide Web, more and more websites require flexible encoding solutions. Videos often need to be encoded at multiple resolutions and multiple bitrates. In addition, many websites support multiple encoded formats. The websites obtain original source content in many video formats and often acquire their new content at random, unpredictable times. Thus, on one day, a website may receive one hundred new videos to host and, on a different day, ten thousand. Video content often has timely relevance (i.e., strong incentives exist to make new content available quickly, often the same day, to potential viewers). Traditionally, video encoding has been effected by the content provider's owning a bank of encoders within its own facility. Since each encoder can process only a fixed amount of video content in a given day and given the timeliness factor, the content provider must provision its system for peak use. This necessitates the creation of a large bank of encoders that sit idle most of the time. Further, the creation of the bank of encoders requires a significant up-front capital expenditure, later amortized over long periods of usage.

SUMMARY

In an exemplary embodiment of the present disclosure, a method for processing a video file. The method comprising the steps of receiving the video file; processing a plurality of partitions of the video file in parallel with a plurality of worker computing resources; and providing a processed video file. In one example thereof, the method further comprises the step of receiving a desired encoding format for the video file, the processed video file being encoded in the desired encoding format. In another example thereof, the method further comprises the step of determining a load associated with a processing of the video file, a number of the plurality of partitions being based on the load. In a variation thereof, the method further comprises the step of receiving at least one of a desired resolution for the processed video file and a desired bit rate for the processed video file, the load being based on the at least one of a desired resolution for the processed video file and a desired bit rate for the processed video file. In a further example thereof, a number of the plurality of worker computing resources is scalable. In yet another example thereof, the plurality of worker computing resources are part of a cloud computing platform.

In another exemplary embodiment of the present disclosure, a system for encoding a video file is provided. The system comprising a scalable computing platform including a video encoding management computing system and a plurality of worker computing resources which may be dynamically activated and deactivated by the video encoding management computing system. The video encoding management computing system receives instructions to encode the video file in a desired encoding format and determines a first number of worker computing resources of the plurality of worker computing systems needed to encode the video file. The video encoding management computing system instructing the first number of worker computing resources of the plurality of worker computing resources to encode the video file in the desired encoding format. In one example thereof, the first number of worker computing resources of the plurality of worker computing resources each encode a respective portion of the video file in the desired encoding format in parallel. In another example thereof, a first one of the first number of worker computing resources of the plurality of worker computing resources partitions the video file into a plurality of partitions and assigns each partition to a respective one of the first number of worker computing resources of the plurality of worker computing resources for encoding in the desired format in parallel. In a variation thereof, the plurality of partitions are a plurality of separate video clips. In another variation thereof, the plurality of partitions are a plurality of time intervals of the video file. In still another variation thereof, the first one of the first number of worker computing resources of the plurality of worker computing resources receives a plurality of processed video partitions from the remaining first number of worker computing resources of the plurality of worker computing resources. In a further variation thereof, the first one of the first number of worker computing resources of the plurality of worker computing resources based on the plurality of processed video partitions produces a processed video file in the desired encoding format.

In yet another exemplary embodiment of the present disclosure, a system for encoding a video file is provided. The system comprising a video encoding management controller executing a processing sequence based on the video file. The processing sequence comprising the steps of determining a load to produce a processed video file based on the video file and a desired encoding format; determining a first number of computer resources needed to produce the processed video file; assigning a first computer resource of the first number of computer resources as a master computer resource; and instructing the master computer resource to partition the video file into a plurality of partitions for encoding by the first number of computer resources in parallel. In an example thereof, the processing sequence further comprises the step of launching the first number of computer resources. In a variation thereof, the first number of computer resources are part of a scalable computer system and are launched programmatically.

In still another exemplary embodiment of the present disclosure, the method for processing a video file is provided. The method comprising the steps of receiving the video file; receiving a desired encoding format for the video file; determining a load to produce a processed video file based on the video file and the desired encoding format; determining a first number of computer resources needed to produce the processed video file; assigning a first computer resource of the first number of computer resources as a master computer resource; and instructing the master computer resource to partition the video file into a plurality of partitions for encoding by the first number of computer resources in parallel. In an example thereof, the method further comprises the step of launching the first number of computer resources. In a variation thereof, the first number of computer resources are part of a scalable computer system and are launched programmatically. In another example thereof, the method further comprises the step of receiving a notification from the master computer resource that the processed video file is complete. In a variation thereof, the method further comprises the step of providing a notification that the processed video file is complete.

In a further exemplary embodiment of the present disclosure, a non-transitory computer readable medium including a plurality of instructions which are executed by a computing resource in the processing of a video file based on a desired encoding format is provided. The plurality of instructions comprising instructions to determine a load to produce a processed video file based on the video file and the desired encoding format; instructions to determine a first number of computer resources needed to produce the processed video file; instructions to assign a first computer resource of the first number of computer resources as a master computer resource; and instructions the request the master computer resource partition the video file into a plurality of partitions for encoding by the first number of computer resources in parallel.

In yet a further exemplary embodiment of the present disclosure, a method for processing a video file is provided. The method comprising the steps of receiving a video file; determining a load associated a processing of the video file; processing a plurality of partitions of the video file in parallel with a plurality of worker computing systems; and providing a processed video file. In an example thereof, the method further comprises the step of receiving a desired encoding format for the video file, the processed video file being encoded in the desired encoding format. In another example thereof, the method further comprises the step of receiving at least one of a desired resolution for the processed video file and a desired bit rate for the processed video file, the load being based on the at least one of a desired resolution for the processed video file and a desired bit rate for the processed video file. In yet another example thereof, a number of the plurality of worker instances is scalable. In still another example thereof, the plurality of worker instances are part of a cloud computing platform.

In still a further exemplary embodiment of the present disclosure, a system for encoding a video file is provided. The system comprising a cloud computing platform including a video encoding management computing system and a plurality of worker computing systems which may be dynamically activated and deactivated by the video encoding management computing system. The video encoding management system receives instructions to encode a video file in a desired encoding format and determines a number of worker computing systems needed to encode the video file, the video encoding management computing system activating the number of worker computing systems to encode the video file.

The above and other features of the present disclosure, which alone or in any combination may comprise patentable subject matter, will become apparent from the following description and the attached drawings.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 9 illustrates the interaction between a master worker computing system of the video encoding system and a file transfer system of the video encoding system;

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

The embodiments disclosed herein are not intended to be exhaustive or limit the invention to the precise form disclosed in the following detailed description. Rather, the embodiment is chosen and described so that others skilled in the art may utilize its teachings.

Figure 1:
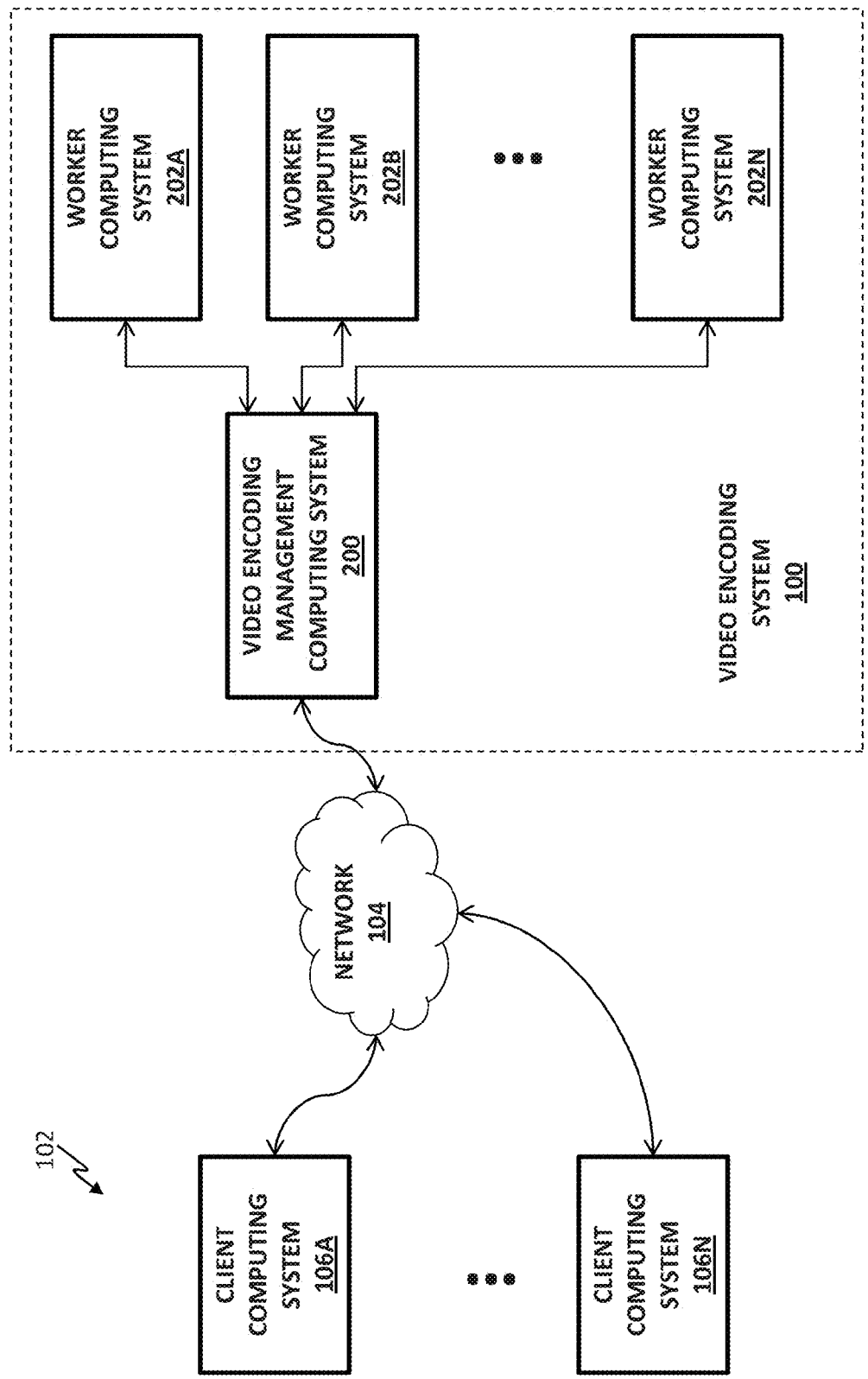
FIG. 1 illustrates an exemplary video encoding system in communication with a plurality of clients.

Referring to FIG. 1, a video encoding system 100 is shown. Video encoding system 100 receives and sends information to a plurality of clients 102 through one or more networks 104. Networks 104 may include private networks, public networks, such as the Internet, local area networks, wide area networks, cellular networks, wired networks, wireless networks, and combinations thereof.

Exemplary information that video encoding system 100 receives from a client computing system 106 is a video file 110 and information regarding a processing of the video file 110. In one embodiment, client computing system 106 sends the video file 110 to video encoding system 100 or instructs another computing system to send the video file 110 to video encoding system 100. In one embodiment, client computing system 106 provides video encoding system 100 instructions on how to retrieve the video file 110.

Exemplary information that video encoding system 100 sends to client computing system 106 includes at least one processed video file 112 which is generated based on the video file 110 and the information regarding processing of video file 110. In one embodiment, video encoding system 100 sends the processed video file 112 to client computing system 106 or instructs another computing system to send the processed video file 112 to client computing system 106. In one embodiment, video encoding system 100 sends the processed video file 112 to a destination specified by client computing system 106 or instructs another computing system to send the processed video file 112 to a destination specified by client computing system 106. In one embodiment, video encoding system 100 provides client computing system 106 instructions on how to retrieve the processed video file 112.

In the illustrated embodiment, the information regarding processing of video file 110 includes information related to the desired video encoding format. Exemplary information related to the format of video file 110 includes the video encoding format, a bit rate, a resolution, and other suitable information. Additional exemplary information regarding processing of video file 110 may include key point positions and other metadata. In one embodiment, the information relates to multiple encoding formats for the video file 110 so that multiple processed video files are produced by video encoding system 100.

Figure 2:
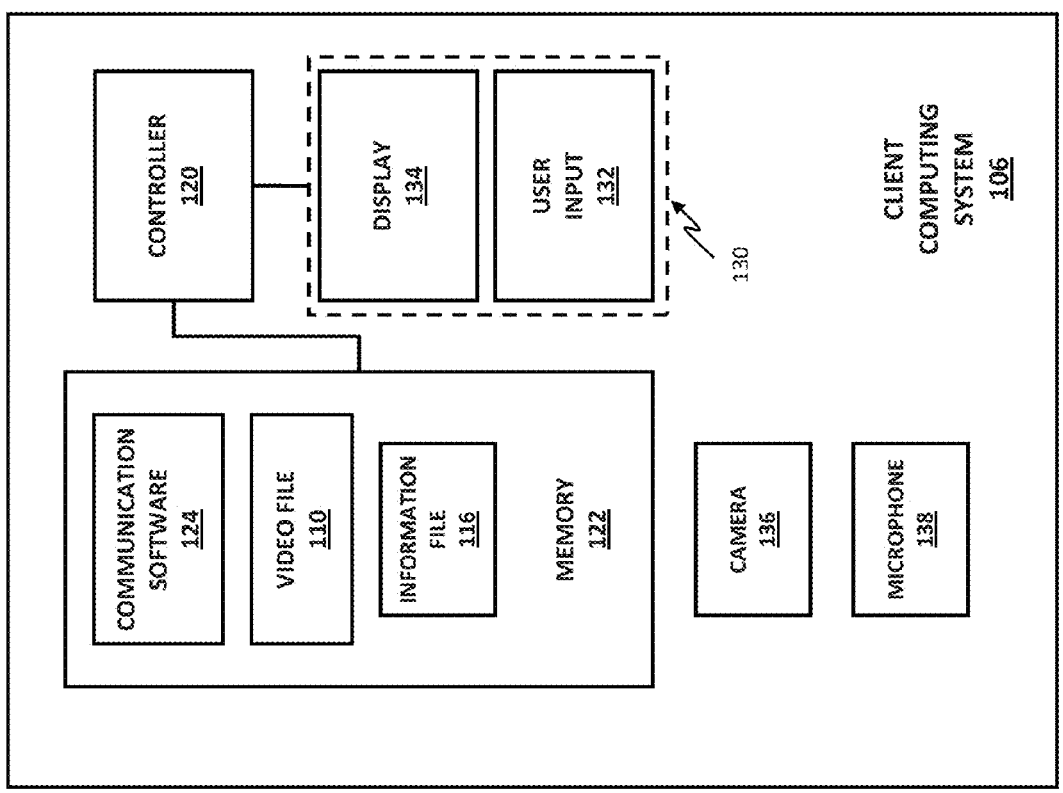
FIG. 2 illustrates an exemplary client computing system.

Referring to FIG. 2, an exemplary client computing system 106 is represented. Client computing system 106 includes a controller 120. Controller 120 has access to memory 122. Memory 122 includes communication software 124 which when executed by controller 120 permits client computing system 106 to communicate with other computing devices over network 104. Although illustrated as software, communication software 124 may be implemented as software, hardware, or a combination thereof. Client computing system 106 further includes at least one video file 110 which is stored on memory 122. An information file 116 is also shown stored on memory 122. In one embodiment, information file 116 includes the information regarding processing of video file 110. In one embodiment, the information regarding processing of video file 110 is stored as part of video file 110.

Client computing system 106 further includes a user interface 130. User interface 130 includes one or more input devices 132 and one or more output devices, illustratively a display 134. Exemplary input devices include a keyboard, a mouse, a pointer device, a trackball, a button, a switch, a touch screen, and other suitable devices which allow an operator to provide input to client computing system 106. Exemplary output devices include a display, a touch screen, a printer, speakers, and other suitable devices which provide information to an operator of client computing system 106.

In one embodiment, client computing system 106 further includes a video camera 136 and associated microphone 138. Video camera 136 may be used to capture video file 110. In one embodiment, client computing system 106 receives video file 110 from another computing device. Exemplary client computing systems 106 include desktop computers, laptop computers, tablet computers, cell phones, smart phones, video cameras, and other suitable computing devices.

In the illustrated embodiment, client computing system 106 is a single system. In another embodiment, client computing system 106 includes two or more systems in communication with each other. In the illustrative embodiment, client computing system 106 includes a controller 120 which may be one or more processors operating together and a memory 122 which may be multiple memories accessible by controller 120. Memory 122 associated with the one or more processors of controller 120 may include, but is not limited to, memory associated with the execution of software and memory associated with the storage of data. Memory 122 includes computer readable media. Computer-readable media may be any available media that may be accessed by one or more processors of controller 120 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other non-transitory medium which may be used to store the desired information and which may be accessed by controller 120.

Returning to FIG. 1, video encoding system 100 includes a video encoding management computing system 200 and a plurality of worker computing systems 202. In one embodiment, a number of the worker computing systems 202 is fixed. In one embodiment, the number of worker computing systems 202 is dynamic and provides a scalable, on-demand system.

In one embodiment, video encoding system 100 is employed based on a cloud-computing platform. In one embodiment, cloud computing refers to a third party provided service where sizeable on-demand computing resources are available. The computing resources in the cloud computing embodiment are delivered in terms of worker computing systems 202 or instances. An "instance" is a computing resource having a particular CPU, a certain amount of memory and a certain amount of hard-disk space. The instances may be launched and shut down programmatically. In one embodiment, the number of computer resources is fixed. In one embodiment, the number of computer resources is dynamic and provides a scalable, on-demand system.

Figure 3:
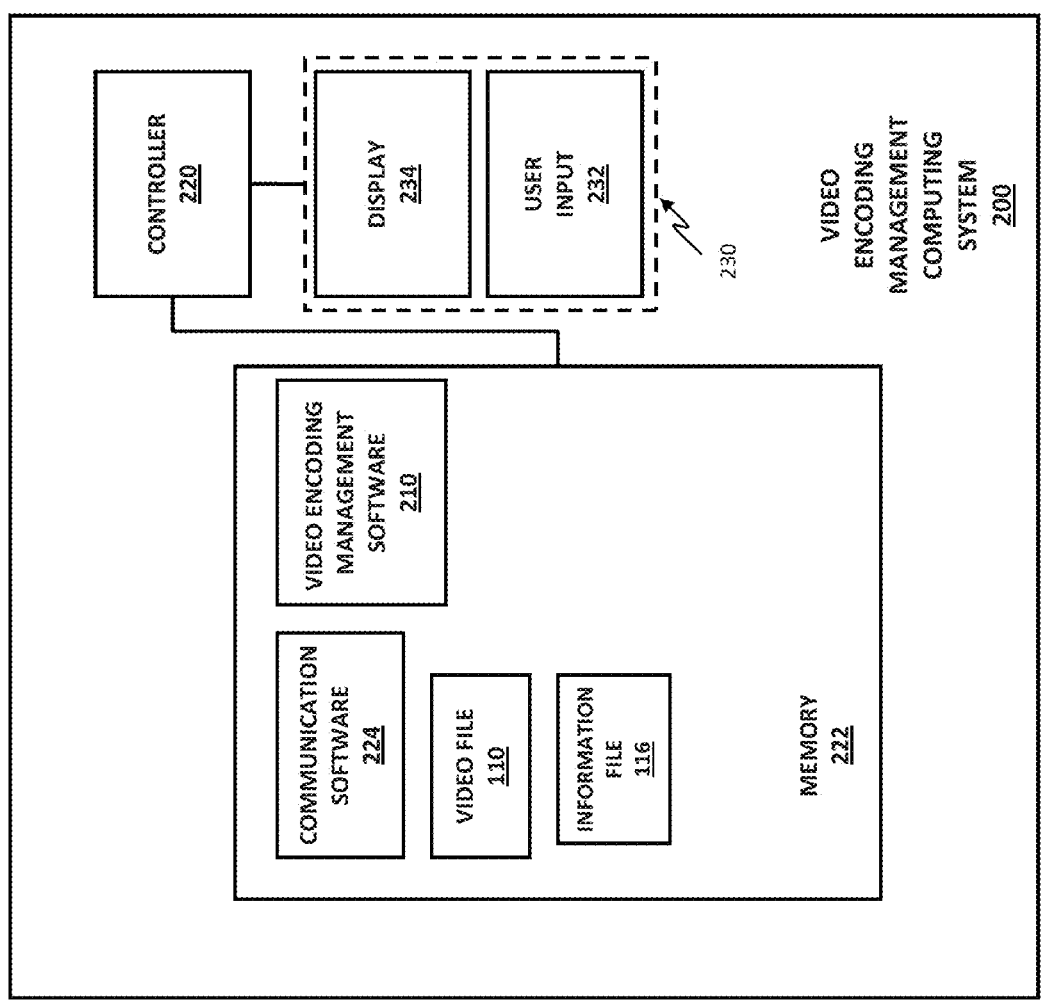
FIG. 3 illustrates an exemplary video encoding management computing system of the video encoding system of FIG. 1.

Referring to FIG. 3, an exemplary video encoding management computing system 200 is represented. Video encoding management computing system 200 includes a controller 220. Controller 220 has access to memory 222. Memory 222 includes communication software 224 which when executed by controller 220 permits video encoding management computing system 200 to communicate with other computing devices over network 104 or other networks. Although illustrated as software, communication software 224 may be implemented as software, hardware, or a combination thereof. Video encoding management computing system 200 further includes video file 110 and information file 116 which are received from a client computing system 106 and are stored on memory 222. Exemplary video encoding management computing systems 200 include desktop computers, laptop computers, tablet computers, cell phones, smart phones, and other suitable computing devices.

Video encoding management computing system 200 further includes a user interface 230. User interface 230 includes one or more input devices 232 and one or more output devices, illustratively a display 234. Exemplary input devices include a keyboard, a mouse, a pointer device, a trackball, a button, a switch, a touch screen, and other suitable devices which allow an operator to provide input to video encoding management computing system 200. Exemplary output devices include a display, a touch screen, a printer, and other suitable devices which provide information to an operator of video encoding management computing system 200.

In the illustrated embodiment, video encoding management computing system 200 is a single system. In another embodiment, video encoding management computing system 200 includes two or more systems in communication with each other. In the illustrative embodiment, video encoding management computing system 200 includes controller 220 which may be one or more processors operating together and memory 222 which may be multiple memories accessible by controller 220. Memory 222 associated with the one or more processors of controller 220 may include, but is not limited to, memory associated with the execution of software and memory associated with the storage of data. Memory 222 includes computer readable media. Computer-readable media may be any available media that may be accessed by one or more processors of controller 220 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other non-transitory medium which may be used to store the desired information and which may be accessed by controller 220.

Memory 222 further includes video encoding management software 210. Video encoding management software 210 relates to the processing of video file 110. In a cloud or other distributed computing embodiment, controller 220 executes video encoding management software 210 to process video file 110. For example, controller 220 based on the size of video file 110 and desired processing of video file 110 determines a number of worker computing systems 202 to use to process video file 110 and assigns a respective worker computing systems 202 to function as a master worker computing system 206. Although illustrated as software, video encoding management software 210 may be implemented as software, hardware, or a combination thereof.

Figure 11:
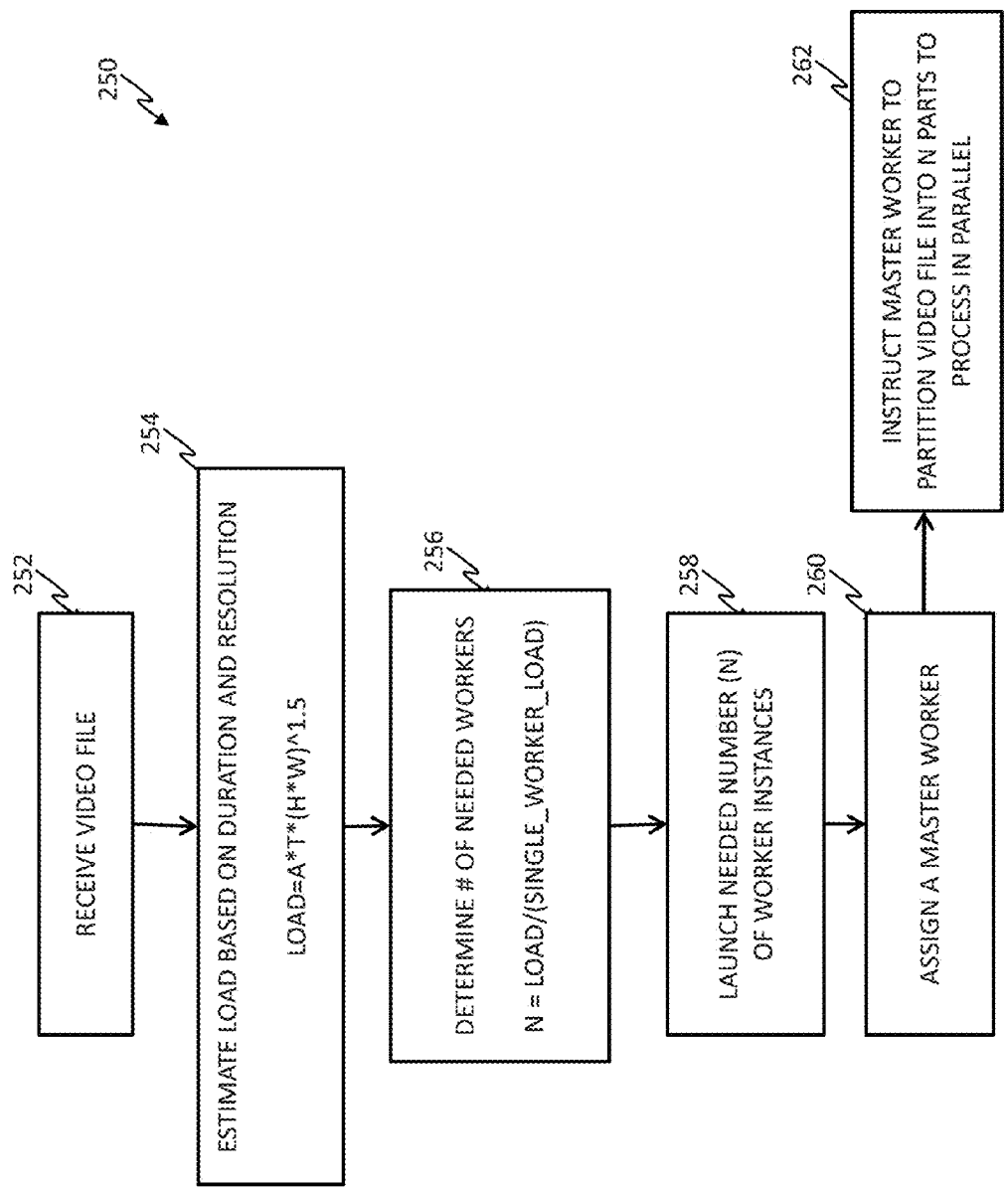
FIG. 11 illustrates an exemplary processing sequence of the video encoding system of FIG. 1.

Referring to FIG. 11, an exemplary processing sequence 250 of video encoding management computing system 200 is illustrated. Video file 110 is received by video encoding management computing system 200, as represented by block 252. Video encoding management computing system 200 analyzes video file 110 and information file 116 to determine the desired processing of video file 110. In one embodiment, information file 116 includes a desired target encoding format, the resolution of the target encoding format for video file 110 and a bit rate of the target encoding format for video file 110.

Returning to FIG. 11, video encoding management computing system 200 determines an estimated load on video encoding system 100, as represented by block 254. In one embodiment, the estimated load is determined based on equation (1):

$$\text{LOAD} = (A)(T)[(H)(W)]^n \quad (1)$$

wherein LOAD=the estimated load on video encoding system 100; (A)=the desired frame rate of the target encoding; (T)=is the duration of video file 110, (H)=is the number of rows in the target encoding; (W)=is the number of columns in the target encoding; and n is based on the speed of the encoding software of worker computing systems 202. In one embodiment, the encoding software is the Lyrical Labs H.264 encoder available from Lyrical Labs located at 405 Park Ave., New York, N.Y. 10022. In this case the value of n is 1.5. In one embodiment, the value is n is between about 1.2 to about 2.5. Another exemplary video encoder is x264 available from VideoLAN.

Video encoding management computing system 200 based on the determined LOAD determines a number of worker computing systems 202, as represented by block 256. In one embodiment, the estimated load is determined based on equation (2):

$$NUM = \text{CEILING}\left[\frac{\text{LOAD}}{(\text{SINGLE\_WORKER\_LOAD})}\right] \quad (2)$$

wherein NUM=the number of worker computing systems 202 to launch; LOAD=the estimated load of video encoding system 100; and SINGLE_WORKER_LOAD=the load capacity of an exemplary worker computing systems 202, and the CEILING function increases NUM to the smallest following integer. Video encoding management computing system 200 launches the determined number of worker computing systems 202 needed to process video file 110, as represented by block 258. Video encoding management computing system 200 further designates one of the worker computing systems 202 as a master worker computing system 206 to manage the processing of video file 110, as represented by block 260. Video encoding management computing system 200 passes video file 110 to the master worker computing system 206 and instructs the master worker computing system 206 to partition video file 110 into a number of partitions equal to the number of worker computing systems 202 launched, as represented by block 262. In this case, master worker computing system 206 also encodes a partition of video file 110.

Figure 4:
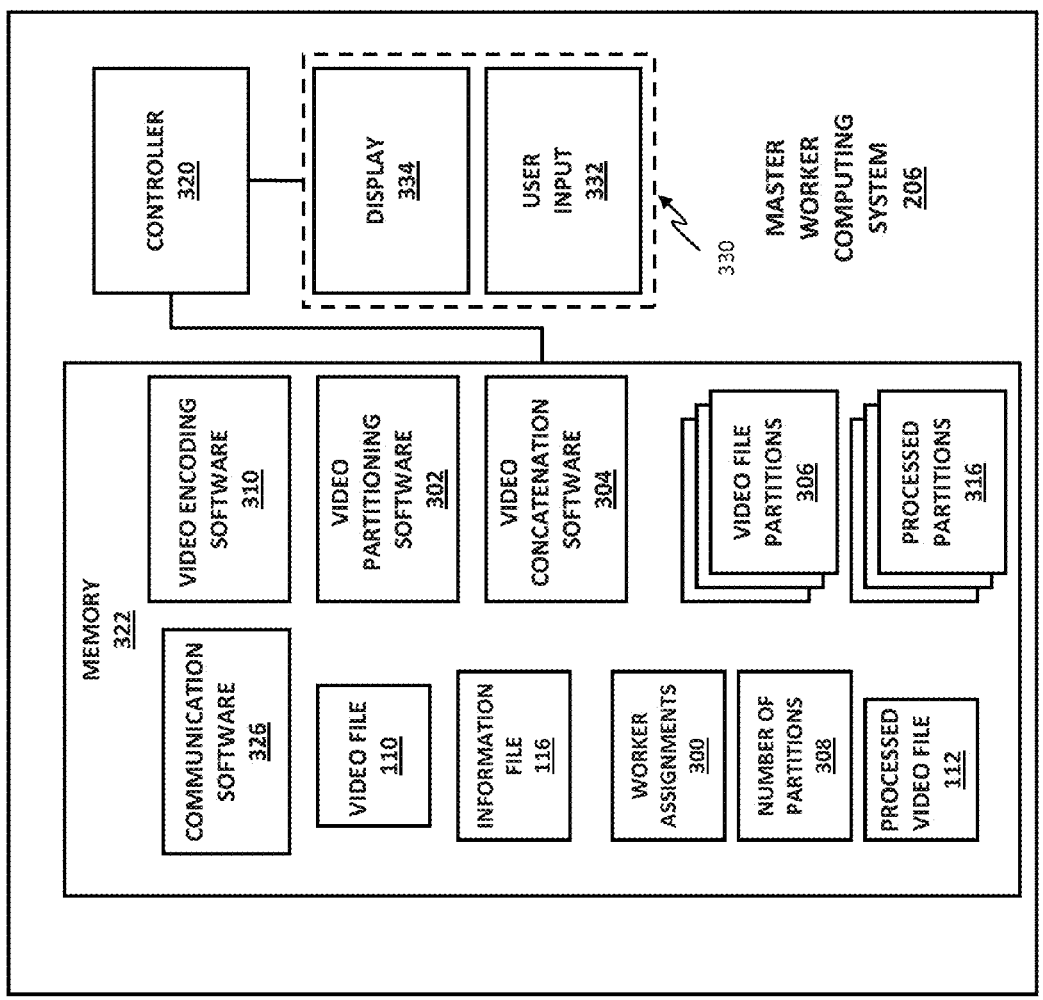
FIG. 4 illustrates an exemplary master worker computing system of the video encoding system of FIG. 1.

Referring to FIG. 4, an exemplary master worker computing system 206 is represented. Master worker computing system 206 includes a controller 320. Controller 320 has access to memory 322. Memory 322 includes communication software 324 which when executed by controller 320 permits master worker computing system 206 to communicate with other computing devices over network 104 or other networks. Although illustrated as software, communication software 324 may be implemented as software, hardware, or a combination thereof. Master worker computing system 206 further includes video file 110 and information file 116 which are received from video encoding management computing system 200 and stored on memory 322. Exemplary master worker computing systems 206 include desktop computers, laptop computers, tablet computers, cell phones, smart phones, and other suitable computing devices.

Master worker computing system 206 further includes a user interface 330. User interface 330 includes one or more input devices 332 and one or more output devices, illustratively a display 334. Exemplary input devices include a keyboard, a mouse, a pointer device, a trackball, a button, a switch, a touch screen, and other suitable devices which allow an operator to provide input to master worker computing system 206. Exemplary output devices include a display, a touch screen, a printer, and other suitable devices which provide information to an operator of master worker computing system 206.

In the illustrated embodiment, master worker computing system 206 is a single system. In another embodiment, master worker computing system 206 includes two or more systems in communication with each other. In the illustrative embodiment, master worker computing system 206 includes controller 320 which may be one or more processors operating together and memory 322 which may be multiple memories accessible by controller 320. Memory 322 associated with the one or more processors of controller 320 may include, but is not limited to, memory associated with the execution of software and memory associated with the storage of data. Memory 322 includes computer readable media. Computer-readable media may be any available media that may be accessed by one or more processors of controller 320 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other non-transitory medium which may be used to store the desired information and which may be accessed by controller 320.

Memory 322 further includes video partitioning software 302, video concatenation software 304, video encoding software 310, the number of partitions 308, and worker computing system assignment index 300. Video partitioning software 302 partitions video file 110 into generally equal length durations for processing by master worker computing system 206 and the remaining worker computing systems 202. In one embodiment, video partitioning software 302 generates separate video clips, each corresponding to a given partition. In one example, video management system determines the time windows for each partition, such as the interval between the two minute and four minute marks of the clip, and provides these time intervals to the video partitioning software 302 which generates the separate video clips. Exemplary video partitioning software 302 is Ffmpeg. Video concatenation software 304 concatenates video pieces into a video file. Exemplary video concatenation software 304 is Flvbind available from FLVSoft. Video encoding software 310 relates to the processing of video file 110. Controller 320 encodes at least one partition of video file 110 to the targeted encoding format specified in information file 116. An exemplary video encoding software 310 is x264 available from VideoLAN. Although video partitioning software 302, video concatenation software 304, and video encoding software 310 are shown as separate software modules, one or more of video partitioning software 302, video concatenation software 304, and video encoding software 310 may be combined together into a software module. Although video partitioning software 302, video concatenation software 304, and video encoding software 310 are illustrated as software, one or more of video partitioning software 302, video concatenation software 304, and video encoding software 310 may be implemented as software, hardware, or a combination thereof.

The number of partitions 308 corresponds to the number of worker computing systems 202 launched by video encoding management computing system 200 to partition video file 110. Master worker computing system 206 based on number of partitions 308 partitions video file 110 into partitions 306 with the video partitioning software 302. In one embodiment, partitions 306 are video clips, each corresponding to a respective time interval. In this embodiment, the master computing system 206 instructs the respective worker computing system 202 to retrieve the respective partition 306 and to process the respective partition 306 of the video file 110. Master worker computing system 206 stores an index 300 (see FIG. 12) of the respective partitions and the respective worker computing systems 202. In this manner, master worker computing system 206 is able to order the processed partitions 316 received back from the worker computing systems 202 to generate processed video file 112.

Figure 5:
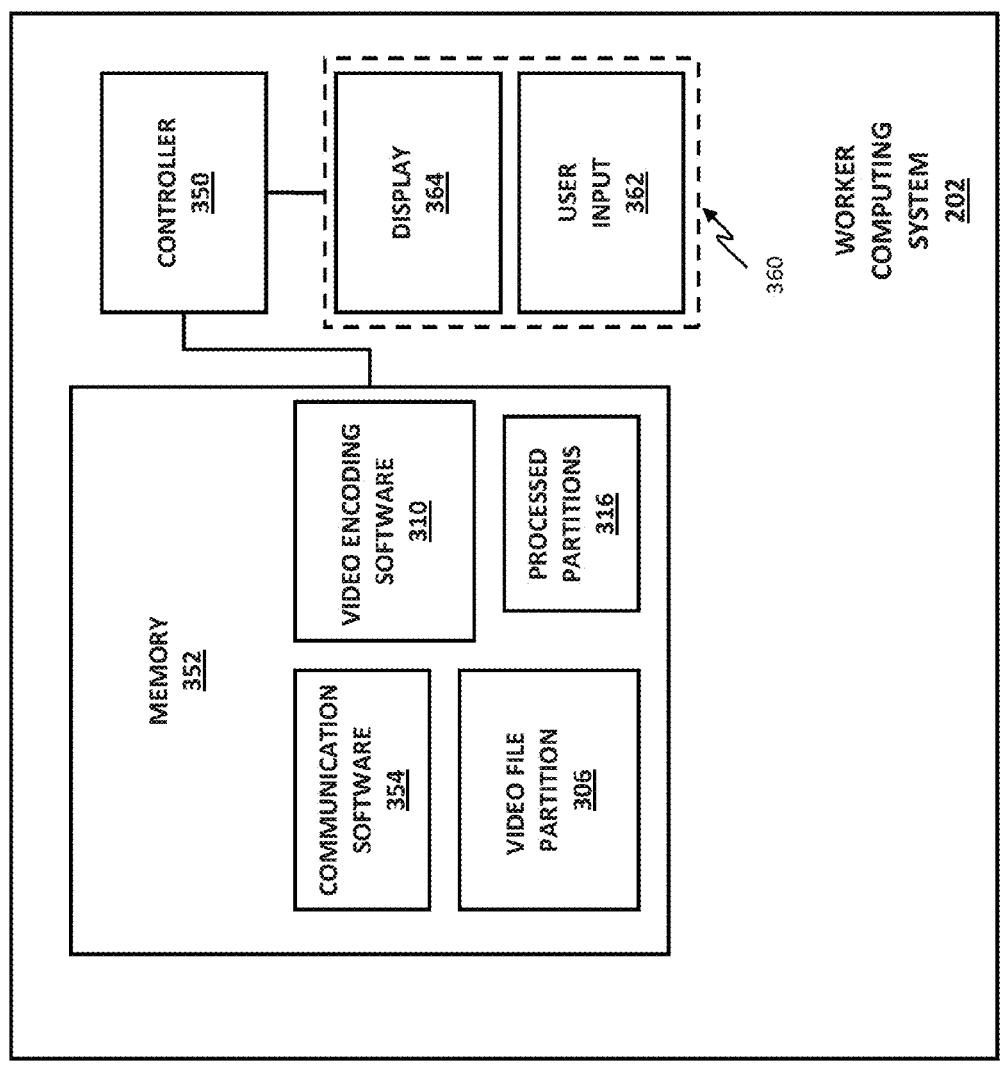
FIG. 5 illustrates an exemplary worker computing system of the video encoding system of FIG. 1.

Referring to FIG. 5, an exemplary worker computing systems 202 is represented. Worker computing systems 202 includes a controller 350. Controller 350 has access to memory 352. Memory 352 includes communication software 354 which when executed by controller 350 permits worker computing systems 202 to communicate with other computing devices over network 104 or other networks. Although illustrated as software, communication software 354 may be implemented as software, hardware, or a combination thereof. Worker computing systems 202 further includes one of partitions 306 which are received from master worker computing system 206 and stored on memory 352. Exemplary worker computing systems 202 include desktop computers, laptop computers, tablet computers, cell phones, smart phones, and other suitable computing devices.

Worker computing systems 202 further includes a user interface 360. User interface 360 includes one or more input devices 362 and one or more output devices, illustratively a display 364. Exemplary input devices include a keyboard, a mouse, a pointer device, a trackball, a button, a switch, a touch screen, and other suitable devices which allow an operator to provide input to worker computing system 202. Exemplary output devices include a display, a touch screen, a printer, and other suitable devices which provide information to an operator of worker computing system 202.

In the illustrated embodiment, worker computing systems 202 is a single system. In another embodiment, worker computing systems 202 includes two or more systems in communication with each other. In the illustrative embodiment, worker computing systems 202 includes controller 350 which may be one or more processors operating together and memory 352 which may be multiple memories accessible by controller 350. Memory 352 associated with the one or more processors of controller 350 may include, but is not limited to, memory associated with the execution of software and memory associated with the storage of data. Memory 352 includes computer readable media. Computer-readable media may be any available media that may be accessed by one or more processors of controller 350 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other non-transitory medium which may be used to store the desired information and which may be accessed by controller 350.

Memory 352 further includes video encoding software 310. Video encoding software 310 relates to the processing of assigned partitions 306. Controller 350 encodes the assigned partition 306 of video file 110 to the targeted encoding format to produce a processed partition 316.

Figure 12:
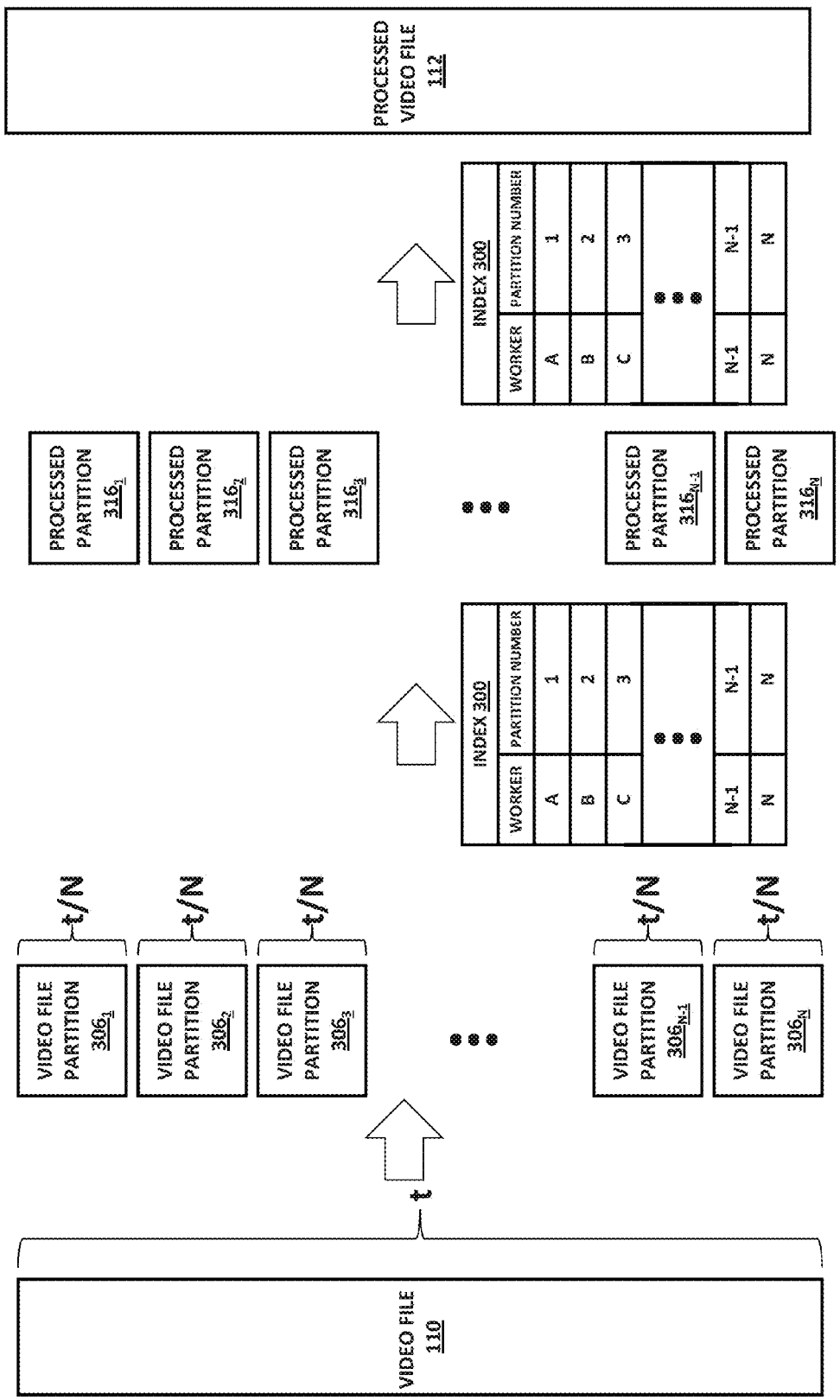
FIG. 12 illustrates an exemplary processing of the video encoding system of FIG. 1.

When all of processed partitions 316 are received by master worker computing system 206, master worker computing system 206 concatenates the processed partitions 316 to produce processed video file 112 (see FIG. 12). Processed video file 112 is then either communicated back to the requesting client computing system 106 or sent to another computing device as instructed by client computing system 106.

Figure 6:
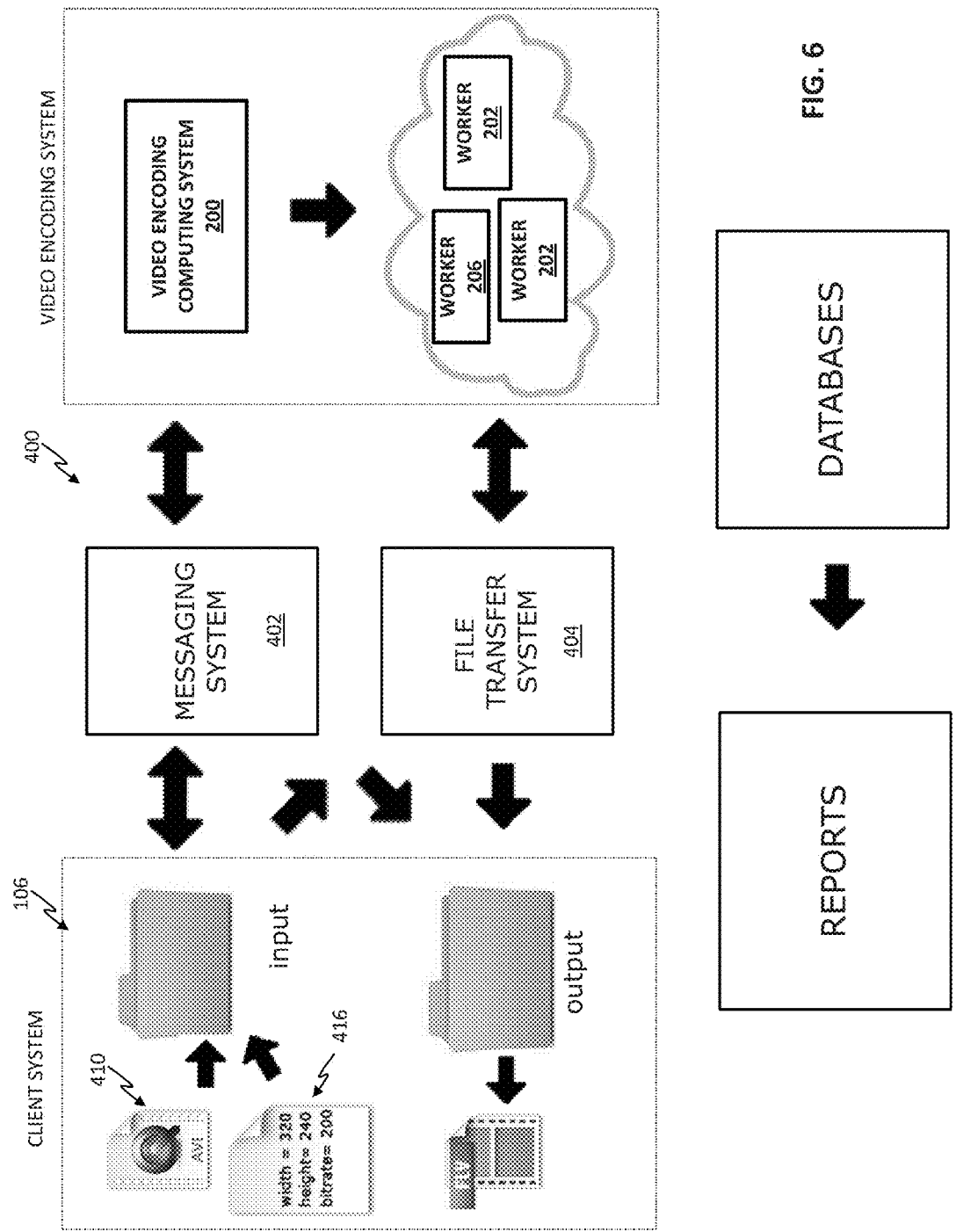
FIG. 6 illustrates an exemplary embodiment of the video encoding system of FIG. 1.

Referring to FIGS. 6-10 an exemplary embodiment of video encoding system 100 is described. In the illustrated embodiment, an Amazon Elastic Compute Cloud® ("Amazon EC2") service available from Amazon Web Services®. The overall system 400 for the illustrated embodiment is shown in FIG. 6.

A messaging system 402 is also used for communication between client computing systems 106 and video encoding system 100. In the illustrated embodiment, Amazon's Simple Queuing Service ("Amazon SQS") is used for messaging. A queuing system allows messages to be communicated between client computing system 106 and the in-the-cloud computing system of video encoding system 100. A file-hosting system 404 to share files between instances, the worker computing systems 202 and master worker computing system 206, and between the in-the-cloud system and the client, client computing system 106, is provided. In the illustrated embodiment, Amazon's S3 file system ("Amazon S3") is used for file transfer.

The encoding process begins with the content host, hereinafter called the "publisher", copying a video file 410 into a specified directory 408 on its own server, client computing system 106. In addition to the video file 410, the publisher provides an information file 416 specifying the resolution and bitrate for the target encoding. Multiple target resolutions and bitrates may be specified within a single information file 416.

Next, the files (both the video 410 and the information files 416) are transferred to the cloud-based file system by a local service, file-hosting system 404, running on the publisher's server, client computing system 106. In the illustrated embodiment, Amazon S3 is used.

Figure 7:
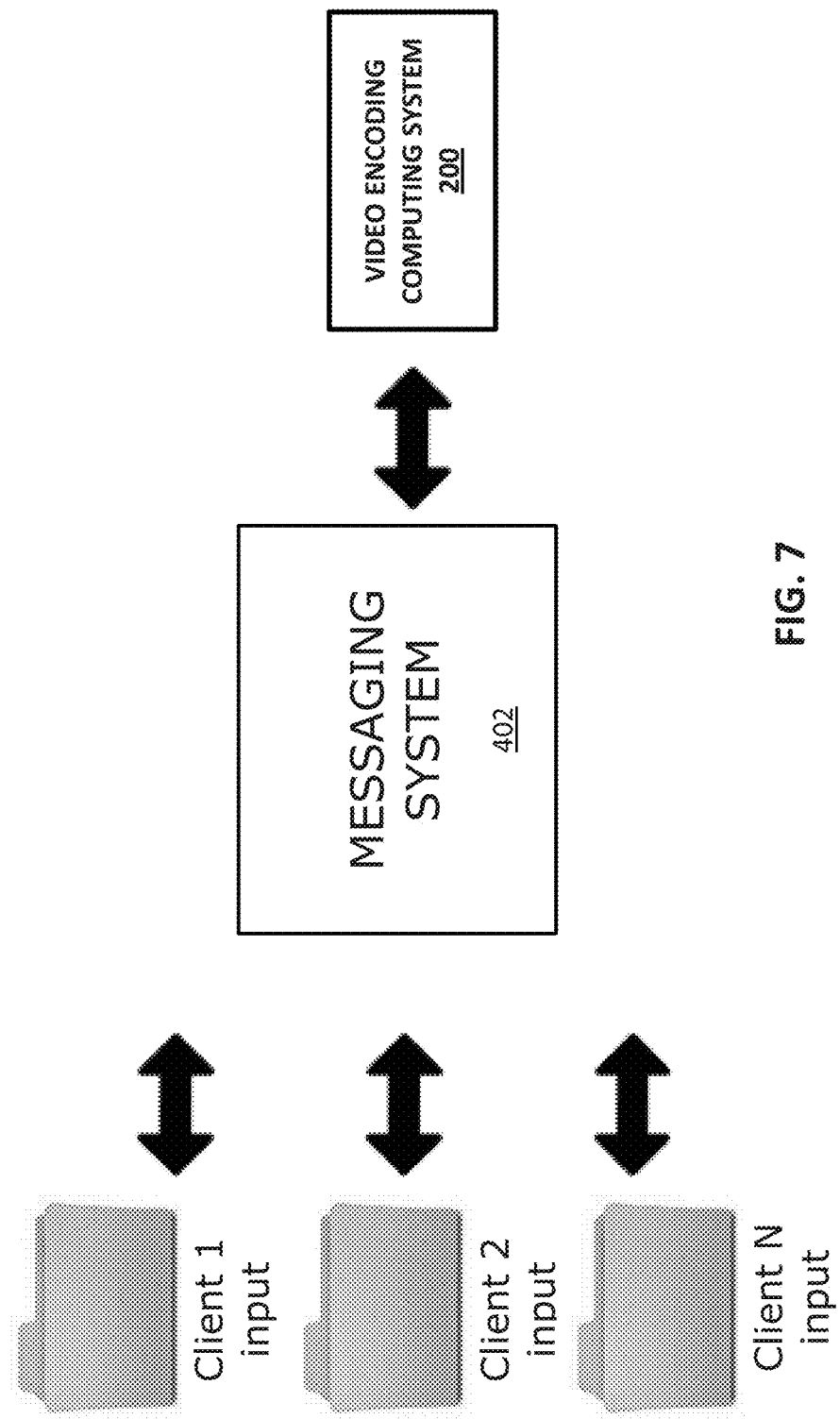
FIG. 7 illustrates the interaction between a plurality of clients and a computer system of the video encoding system through a messaging system.
Figure 8:
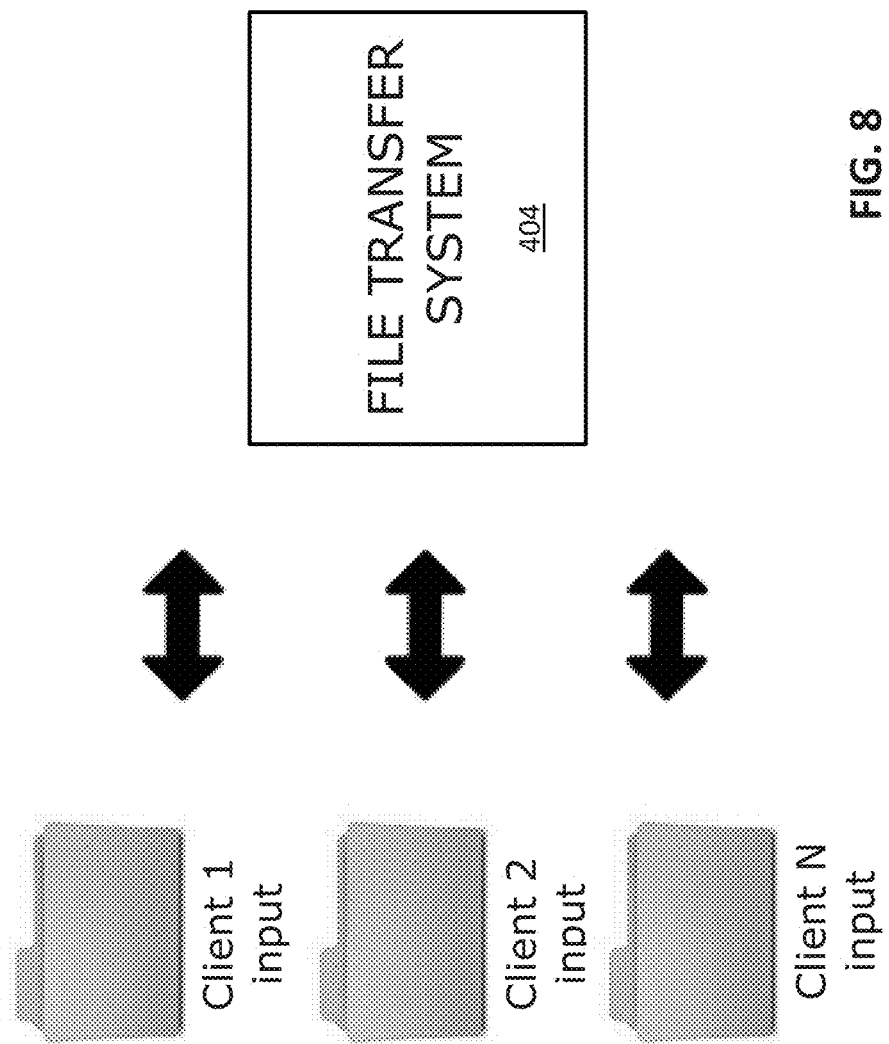
FIG. 8 illustrates the interaction between a plurality of clients and a file transfer system of the video encoding system.

The publisher's local service, file-hosting system 404, places a message on the message queue of messaging system 402 that the specific file has been uploaded. In the illustrated embodiment, Amazon SQS is used. The Amazon SQS is a bi-directional, highly available service, accessible by many client computing systems 106 simultaneously. The Clip Manager or video encoding management software 210, which is a service running on a cloud-based instance, video encoding management computing system 200, accesses the queue and reads the specific messages regarding which file to encode. As shown in FIG. 7, video encoding management computing system 200 is able to communicate with multiple client computing system 106 through messaging system 402. The Amazon SQS based communication ensures the Clip Manager does not miss messages due to heavy computational loads, as the Clip Manager will simply access Amazon SQS when the Clip Manager has available resources. The video file 410 and the associated information file 416 reside on the file-hosting system 404 ready to be accessed.

When the Clip Manager accesses a message on the message queue indicating that a new file is to be encoded, it accesses the video file 410 and the information file 416 from file-hosting system 404 and determines the resources needed to complete the encoding. The Clip Manager may decide to use a single instance to process a video clip or it may split the job up among multiple instances. In the illustrated embodiment, a single instance is loaded with a fixed compute load (i.e., a video clip at a specific resolution for a particular length of time). Depending on resolution, a video file will be processed in pieces of fixed lengths. The length of the pieces is a function of the target resolution of the encoding. For example, a two hour video clip may be split up into two minute pieces and processed in parallel on 60 instances. However, a 90 second clip would likely be processed on a single instance. The instances are launched programmatically on demand. The cloud-based system only provisions the resources required, and instances that are not used are shut down programmatically.

The instances that are launched to encode a given video clip are termed "worker" instances, such as worker computing systems 202 and master worker computing system 206. A worker instance is given a pointer to the file in file-hosting system 404, Amazon S3, along with the information about the target resolution, bitrate and portion of the file it must encode (e.g., the interval between the two minute and four minute marks of the clip). The worker accesses the video file 410 from file-hosting system 404, Amazon S3. Given the high availability of file-hosting system 404, Amazon S3, many workers can access the same file simultaneously with no degradation of performance due to congestion. The worker decodes its designated time interval to a canonical format. In the illustrated embodiment, the format is uncompressed .yuv files. Many programs in the public domain can decode a wide range of standard formats. The .yuv files are subsequently resized to the target resolution for encoding. An encoder then encodes the file to the target format. In one embodiment, the Lyrical Labs H.264 encoder available from Lyrical Labs located at 405 Park Ave., New York, N.Y. 10022 encodes a .yuv files (Color Space Pixel Format) as input and outputs either .flv (Flash Video File) or .mp4 (MPEG Audio Stream) files or both. The encoder functions at the full range of commercially interesting resolutions and bitrates. The resultant encoded file is placed back into the Amazon S3 queue as illustrated in FIG. 9. Another exemplary video encoder is x264 available from VideoLAN.

If the encoding process was split into multiple parts or partitions, a single worker, master worker computing system 206, will collect the encoded pieces from S3 and concatenate them into a single encoded file, processed video file 112. Many programs in the public domain can do this bitstream concatenation. In the specific embodiment, FLVBind was used.

Once the encoded file is placed in Amazon S3, the worker, master worker computing system 206, notifies the Clip Manager, video encoding management computing system 200, that the job is complete. The Clip Manager, video encoding management computing system 200, assigns a new job to the free worker or terminates the instance if no further jobs exist.

Figure 10:
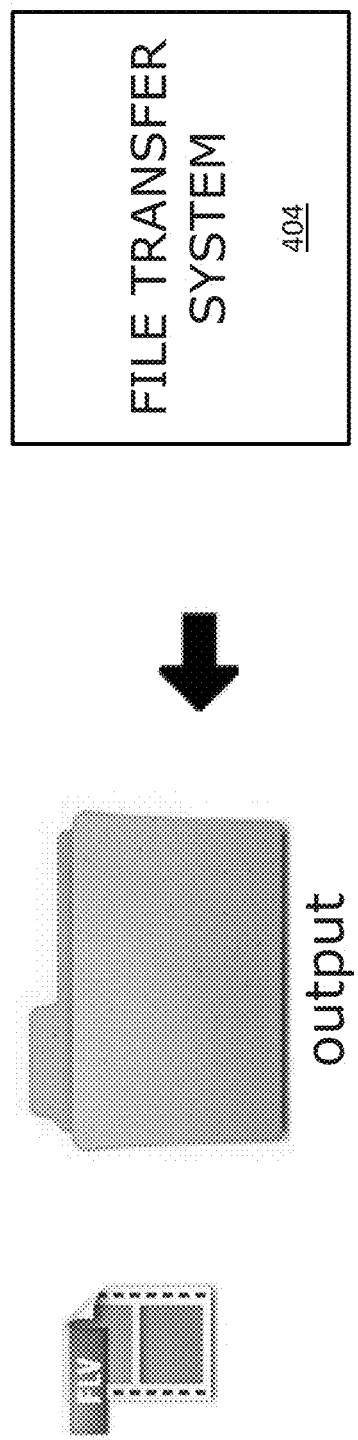
FIG. 10 illustrates the interaction between the file transfer system of the video encoding system and an output directory of one of the clients of FIG. 6.

The Clip Manager, video encoding management computing system 200, then places both a message on the message queue of messaging system 402 that a particular encoding job has been complete and a pointer to the encoded file on file-hosting system 404, Amazon S3. The local service running on the publisher's server will access the message queue and download the encoded file, processed video file 112. Multiple encoded files can result from a single input file. This process is illustrated in FIG. 10.

In the illustrated embodiment, the publisher does not need to provision a large encoder farm targeted to peak use. The cloud-based system scales to the customer's demands, and the customer's cost is only related to that of the actual compute resources used. There are substantially no up-front costs, so the publisher's costs scale with their business, providing a strong economic advantage.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for processing a video file using a plurality of worker computing resources, the method comprising the steps of:

receiving the video file;

receiving a desired target encoding format for the video file;
determining a load associated with a processing of the video file, the load being determined based on a desired frame rate of the received desired target encoding format, a duration of the video file, and a term comprising a product of a number of rows in the desired target encoding format and a number of columns in the desired target encoding format, wherein the product is raised to an exponent that is determined based on a speed of the plurality of worker computing resources;
determining a number of a plurality of partitions of the video file according to the determined load and a load capacity of each worker computing resource of the plurality of worker computing resources;
partitioning the video file into the plurality of partitions of the video file, each of the plurality of partitions corresponding to a time interval of the video file;
processing the plurality of partitions of the video file in parallel with the plurality of worker computing resources to produce a plurality of processed partitions; and
providing a processed video file based on the plurality of processed partitions, wherein the processed video file is encoded in the desired target encoding format.

2. The method of claim 1, wherein a number of the plurality of worker computing resources is scalable.

3. The method of claim 1, wherein the plurality of worker computing resources are part of a cloud computing platform.

4. The system of claim 1, wherein the plurality of partitions are a plurality of separate video clips.

5. The system of claim 1, wherein the first one of the first number of worker computing resources of the plurality of worker computing resources receives a plurality of processed video partitions from the remaining first number of worker computing resources of the plurality of worker computing resources.

6. The system of claim 5, wherein the first one of the first number of worker computing resources of the plurality of worker computing resources based on the plurality of processed video partitions produces a processed video file in the desired encoding format.

7. A system for encoding a video file, the system comprising:
a scalable computing platform including:
  a video encoding management computing system; and
  a plurality of worker computing resources which may be dynamically activated and deactivated by the video encoding management computing system,
  wherein the video encoding management computing system (1) receives instructions to encode the video file in a desired target encoding format; (2) determines a first number of worker computing resources of the plurality of worker computing systems needed to encode the video file based on a load associated with a processing of the video file and a load capacity of each worker computing system of the plurality of worker computing systems, the load being determined based on a desired frame rate of the desired target encoding format and a term comprising a product of a number of rows in the desired target encoding format and a number of columns in the desired target encoding format, wherein the product is raised to an exponent that is determined based on a speed of the plurality of worker computing resources; and (3) instructs the first number of worker computing resources of the plurality of worker computing resources to encode the video file in the desired encoding format;
  wherein a first one of the first number of worker computing resources of the plurality of worker computing resources (1) partitions the video file into a plurality of partitions, the number of the plurality of partitions being equal to the first number of worker computing resources, and (2) assigns each partition to a respective one of the first number of worker computing resources of the plurality of worker computing resources for encoding in the desired format in parallel; and
  wherein each partition of the plurality of partitions corresponds to a time interval of the video file.

8. The system of claim 7, wherein the first number of worker computing resources of the plurality of worker computing resources each encode a respective portion of the video file in the desired encoding format in parallel.

9. The system of claim 7, wherein the first one of the first number of worker computing resources of the plurality of worker computing resources assigns one of the plurality of partitions to itself for encoding in the desired format in parallel with the remaining worker computing resources.

10. A system for encoding a video file, the system comprising:
a video encoding management controller executing a processing sequence based on the video file, the processing sequence comprising the steps of:
  receiving a desired encoding format for the video file;
  determining a load to produce a processed video file based on the video file, a desired frame rate of the desired encoding format, and a term comprising a product of a number of rows in the desired encoding format and a number of columns in the desired encoding format, wherein the product is raised to an exponent that is determined based on a speed of a first number of computer resources;
  determining the first number of computer resources needed to produce the processed video file based on the load and a load capacity of each computer resource;
  assigning a first computer resource of the first number of computer resources as a master computer resource; and
  instructing the master computer resource to partition the video file into a plurality of partitions for encoding by the first number of computer resources in parallel, the number of the plurality of partitions being equal to the first number of computer resources, wherein each partition of the plurality of partitions corresponds to a time interval of the video file.

11. The system of claim 10, wherein the processing sequence further comprises the step of launching the first number of computer resources.

12. The system of claim 11, wherein the first number of computer resources are part of a scalable computer system and are launched programmatically.

13. A method for processing a video file, the method comprising the steps of:
receiving the video file;
receiving a desired target encoding format for the video file;
determining a load to produce a processed video file based on the video file and the desired encoding format, the load being determined based on a desired frame rate of the desired target encoding format, a duration of the video file, and a term comprising a product of a number of rows in the desired target encoding format and a number of columns in the desired target encoding format, wherein the product is raised to an exponent that is determined based on a speed of a first number of computer resources;

determining the first number of computer resources needed to produce the processed video file based on the load and a load capacity of each computer resource;

assigning a first computer resource of the first number of computer resources as a master computer resource; and instructing the master computer resource to partition the video file into a plurality of partitions for encoding by the first number of computer resources in parallel, the number of the plurality of partitions being equal to the first number of computer resources, wherein each partition of the plurality of partitions corresponds to a time interval of the video file.

14. The method of claim 13, further comprising the step of launching the first number of computer resources.

15. The method of claim 14, wherein the first number of computer resources are part of a scalable computer system and are launched programmatically.

16. The method of claim 13, further comprising the step of receiving a notification from the master computer resource that the processed video file is complete.

17. The method of claim 13, wherein the exponent is between about 1.2 and about 2.5.

18. A non-transitory computer readable medium including a plurality of instructions which are executed by a computing resource in the processing of a video file based on a desired target encoding format, the plurality of instructions comprising:

instructions to determine a load to produce a processed video file based on the video file and the desired target encoding format, the load being determined based on a desired frame rate of the desired target encoding format, and a term comprising a product of a number of rows in the desired target encoding format and a number of columns in the desired target encoding format, wherein the product is raised to an exponent that is determined based on a speed of a first number of computer resources;

instructions to determine the first number of computer resources needed to produce the processed video file based on the load and a load capacity of each computer resource;

instructions to assign a first computer resource of the first number of computer resources as a master computer resource; and instructions to request the master computer resource partition the video file into a plurality of partitions for encoding by the first number of computer resources in parallel, the number of the plurality of partitions being equal to the first number of computer resources, wherein each partition of the plurality of partitions corresponds to a time interval of the video file.

19. A method for processing a video file, the method comprising the steps of:

receiving a video file;

receiving a desired encoding format for the video file;

receiving a desired resolution for a processed video file and a desired bit rate for the processed video file;

determining a load associated with a processing of the video file to create the processed video file, the load being based on the desired resolution for the processed video file and the desired bit rate for the processed video file;

determining, based on the bad and a load capacity of a worker instance, a number of worker instances needed to produce the processed video file, wherein the load is based on the desired resolution raised to an exponent associated with an encoding speed of the worker instances, wherein the exponent value is between about 1.2 and about 2.5;

partitioning, according to the number of worker instances, the video file into a plurality of partitions, wherein each partition of the plurality of partitions corresponds to a time interval of the video file;

processing, using the worker instances, the plurality of partitions of the video file in parallel to produce the processed video file; and providing the processed video file in the desired encoding format.

20. The method of claim 19, wherein the worker instances are part of a cloud computing platform.

21. The method of claim 19, wherein the load is further determined based on a duration of the video file, a number of rows in a target encoding, and a number of columns in a target encoding.

22. A system for encoding a video file, the system comprising:

a cloud computing platform including:

a video encoding management computing system; and a plurality of worker computing systems configured to be dynamically activated and deactivated by the video encoding management computing system;

wherein the video encoding management system (1) receives instructions to encode a video file in a desired target encoding format, (2) determines a load associated with encoding the video file in the desired target encoding format, wherein the video encoding management system determines the load based on the desired target encoding format, a duration of the video file, and a term comprising a product of a number of rows in the desired target encoding format and a number of columns in the desired target encoding format, wherein the product is raised to an exponent that is determined based on a speed of a number of worker computing systems, (3) determines the number of worker computing systems needed to encode the video file based on the load and a load capacity of each worker computing system, (4) activates the number of worker computing systems to encode the video file, and (5) instructs one of the number of activated computing systems to partition the video file into a plurality of partitions, according to the number of activated worker computing systems, each of the plurality of partitions corresponding to a time interval of the video file, wherein the load is determined based on a desired frame rate of the desired target encoding format.

* * * * *